(12) United States Patent
Fleuter

(10) Patent No.: US 7,028,226 B2
(45) Date of Patent: Apr. 11, 2006

(54) METHOD FOR CONTROLLING MACHINES AND AN INFORMATION SYSTEM FOR OPERATING A MACHINE

(75) Inventor: Markus Fleuter, Ennigerloh (DE)

(73) Assignee: Westfalia Separator AG, Oelde (DE)

( * ) Notice: Subject to any disclaimer, the term of this patent is extended or adjusted under 35 U.S.C. 154(b) by 388 days.

(21) Appl. No.: 10/275,693

(22) PCT Filed: Apr. 7, 2001

(86) PCT No.: PCT/EP01/04014

§ 371 (c)(1), (2), (4) Date: Nov. 8, 2002

(87) PCT Pub. No.: WO01/90831

PCT Pub. Date: Nov. 29, 2001

(65) Prior Publication Data

US 2003/0093590 A1 May 15, 2003

(30) Foreign Application Priority Data

May 19, 2000 (DE) .................. 100 24 412

(51) Int. Cl.
*G06F 11/00* (2006.01)

(52) U.S. Cl. ................ 714/48; 714/47; 700/110; 702/183

(58) Field of Classification Search ............ 714/47, 714/48; 202/204; 702/183, 188; 700/30, 700/95, 110, 204, 273; 210/739, 742, 85, 210/746; 494/10
See application file for complete search history.

(56) References Cited

U.S. PATENT DOCUMENTS 3,882,305 A * 5/1975 Johnstone .............. 702/183
5,557,549 A * 9/1996 Chang .................. 702/183
5,819,110 A 10/1998 Motoyama (Continued)

FOREIGN PATENT DOCUMENTS

| DE | 25 51 882 B2 | 6/1978 |
| DE | 197 49 002 A1 | 8/1998 |
| EP | 0 822 473 A2 | 2/1998 |
| EP | 0 891 814 A2 | 1/1999 |
| GB | 2 305 818 A | 4/1997 |

OTHER PUBLICATIONS

Alfa Laval Cosmos Brochure. not dated. obtained from www.alfalaval.com/digitalassets/2/file19138__0__cosmo-s.pdf.*

Primary Examiner—Robert Beausoliel
Assistant Examiner—Philip Guyton
(74) Attorney, Agent, or Firm—Barnes & Thornburg LLP

(57) ABSTRACT

The invention relates to a method for controlling machines (20), especially decanters and separators, according to which operational states (30 36), such as current consumption, temperature, conveying speeds, etc. are detected on the machine and are compiled and stored in a computer (5). The data is subsequently transmitted to a second computer (10) in order to be able to analyze this data. The analysis involves the comparison of the actual state with a set state in order to, in the case of a deviation located outside of the tolerance zone, generate an error message that is then automatically output by the second computer (10) to a peripheral unit and/or to additional computers. To this end, an adaptive multi-layer mathematical model of the machine and of the process is generated. According to the invention, an information system for operating a machine (20) is also provided with which the control method can be executed. Potential error states on the machine can be identified early by the automatic detection and relaying of the operational states so that they can be intervened with before damage occurs.

15 Claims, 5 Drawing Sheets

U.S. PATENT DOCUMENTS

| | | | |
|---|---|---|---|
| 5,857,955 A * | 1/1999 | Phillips et al. | 494/5 |
| 5,948,271 A * | 9/1999 | Wardwell et al. | 210/739 |
| 6,063,292 A | 5/2000 | Leung | |
| 6,122,565 A | 9/2000 | Wenning et al. | |
| 6,328,897 B1 | 12/2001 | Leung | |
| 6,385,497 B1 * | 5/2002 | Ogushi et al. | 700/110 |
| 6,549,817 B1 * | 4/2003 | Audibert | 700/50 |
| 6,679,820 B1 * | 1/2004 | Barkus et al. | 494/8 |
| 2002/0049565 A1 * | 4/2002 | Kirila et al. | 702/188 |
| 2002/0049566 A1 * | 4/2002 | Friedrich et al. | 702/188 |

* cited by examiner

Fig. 5

Allgemeines Maschinenmodell: z.B. Dekanter

Dekanter haben im allgemeinen eine besondere Karakteristik

Es gibt allgemeingültige Regeln wie z.B.

Die Stromaufnahme ist abhängig von der Drehzahl des Rotors

| Produktkarakteristika A -61- | | | Produktkarakteristika B -62- | | | Produktkarakteristika B -63- | | |
|---|---|---|---|---|---|---|---|---|
| z.B. Das Produkt wird durch Pressen entwässert- daraus folgt eine Drehmomentabhängigkeit | | | z.B. Das Produkt wird ohne Pressen entwässert- daraus folgt keine Drehmomentabhängigkeit | | | z.B. Das Produkt wird ohne Pressen entwässert- daraus folgt keine Drehmomentabhängigkeit | | |
| Maschinen-spezifische Daten -64- | Maschinen-spezifische Daten -65- | Maschinen-spezifische Daten | Maschinen-spezifische Daten | Maschinen-spezifische Daten | Maschinen-spezifische Daten | Maschinen-spezifische Daten | Maschinen-spezifische Daten | Maschinen-spezifische Daten |
| Baugröße, Motorenaus stattung usw | Baugröße, Motorenaus stattung usw | Baugröße, Motorenaus stattung usw | Baugröße, Motorenaus stattung usw | Baugröße, Motorenaus stattung usw | Baugröße, Motorenaus stattung usw | Baugröße, Motorenaus stattung usw | Baugröße, Motorenaus stattung usw | Baugröße, Motorenaus stattung usw |

-60-

METHOD FOR CONTROLLING MACHINES AND AN INFORMATION SYSTEM FOR OPERATING A MACHINE

The present invention relates to a method for controlling machines, particularly separators and decanters, and to an information system for operating a machine. Such methods and information systems can be used in the case of separators and other types of machines, where operating conditions for the control and monitoring of the machine are detected continuously.

In order to analyze machines set up away from the manufacturer in the event of a breakdown, currently, a manual damage analysis is usually carried out. In this case, the manufacturer first receives a damage report and wants to detect the cause of the damage according to a list of questions. For example, it is first examined whether a fracture of components can be detected which can be recognized on the outside. If such a fracture is determined, no new start should be implemented. The history before the breakdown is then investigated, in that the detected data of the parameters are analyzed, such as the torque, the rotational speeds, the power consumption, the bearing temperatures, vibrations, and the product-specific parameters, such as the inflow quantity, the flocculent quantity, the diluting water quantity, the cooling water quantity, the inflow concentration and the flocculent concentration. If, by means of the data, a damage analysis can be carried out at the manufacturer's, the mechanic can bring the required spare parts and can directly install these so that the machine can be restarted.

In a plurality of cases, however, no fracture of components can be detected from the outside so that it is investigated during the damage analysis whether loud noises or strong vibrations occurred during the breakdown. If this was so, a new start is not recommended. If no additional data were stored with the operator of the machine, a mechanic has to judge the damage at the site. It is only after this assessment that the required spare parts can be ordered and a new start can take place after the installation of the parts.

If nothing conspicuous has occurred during the breakdown of the machine, after a checking of the possibly available data, a new start can take place. In this case, the mechanical parameters may be observed in order to switch the machine off again sufficiently early in the case of anything conspicuous. If nothing conspicuous occurs, product-specific parameters of the process may be examined more closely. The data then have to be forwarded to experts familiar with the process. If the problem cannot be explained, an expert has to travel to the site in order to solve the problem at the site.

Furthermore, it is known, that, in the event of damage, the operator's computer with the data of the machine is linked to a computer of the manufacturer in order to send the data to the manufacturer. However, it is a disadvantage of these current systems that a damage report will be made only when the damage has already occurred. By means of the known systems, no preventive measures can be taken. In addition, the manufacturer receives only relatively few data which are sent to him in the event of damage. However, it is of interest to the manufacturer to learn which components of the machine are loaded or stressed and how the data trend looked before the breakdown.

From German Patent Document DE-AS 25 51 882, a system is known for the wireless remote transmission of the rotational speed of a rotating part, in the case of which data are continuously exchanged between a transmitter and a receiver. This approach is not practical for larger machines because a connection between the transmitter and the receiver must be provided continuously, which represents unnecessary expenditures for most applications.

In addition, in European Patent Document EP 891 814 A2, a method and a system for controlling centrifuges is disclosed, in which parameters detected at the centrifuge are recorded and processed. By means of the central control of the computer, data can also be transmitted to a remote manufacturer of the machine. However, the information system is not suitable for an automatic monitoring operation by the manufacturer.

It is therefore an object of the present invention to provide a method of controlling machines and to provide an information system which permits an automatic monitoring of the machines and, in the event of operating conditions which deviate from a defined desired value range, automatically emits a fault message. The fault diagnosis can then take place from the combination of various measured values on the basis of a comparison with a mathematical process model.

This object is achieved by means of a method of controlling machines having the characteristics of claim 1 and an information system having the characteristics of claim 7.

According to the method according to the invention, the operating conditions, such as the current consumption, the conveying speeds, etc. are detected at the machine and the detected data are collected and stored in a data bank of a first computer. Subsequently, the data are transmitted to a memory of a second computer, preferably to a computer of the manufacturer of the machine. There, the data are compared with the desired operating data of the machine and are analyzed. The actual condition is detected and a fault message is generated if the actual condition deviates from the desired condition. Then, the fault message will automatically be emitted by the second computer. The output can also take place to a peripheral unit and/or to another computer. According to this method, an automatic continuous monitoring of the operating conditions of the machine can take place.

The control method according to the invention is based on the recognition that, in the case of process-related systems and/or separators or decanters, certain disturbances in the sequence of the operation can be recognized early on the basis of certain parameters or the combination of parameters. When, for example, in the case of a conveyer screw, the material is conveyed in a drum, the parameters rotation of the conveyer screw, current consumption, temperature of the bearings and conveying capacity, for example, can be detected. If the current consumption rises and the other parameters remain essentially the same, this points to a change of the consistency of the led-though material or to the approach of a possible clogging. It is conceivable that, for example, before the clogging actually occurs, the operator of the machine can take countermeasures. Should damage nevertheless have occurred, the manufacturer of the machine can rapidly analyze the fault by means of the data automatically transmitted to him, because he possesses sufficient data on the normal operating conditions of the operator's machine. During the fault diagnosis, the actual data are compared with the multilayer mathematical model of the machine type and of the process model. In this context, a multilayer characteristic is that parameters specific to the machine class (such as a decanter or separator), parameters specific to the process (such as drainage or thickening of substance mixtures), and parameters specific to the machine (for example, as a function of the capacity) are available.

The transmission intervals from the operator's machine to the manufacturer may consist of minutes, hours or days. As a result of the periodical detection of the operating conditions, the manufacturer can draw conclusions on the operation and on possible fault conditions so that a reaction can take place early and rapidly. Furthermore, in the case of the automatic checking of the operating conditions, the fault messages can be generated automatically and may, for example, be an acoustic, visual or other warning at the manufacturer's or, in the case of an assignment of the fault, also a control command for the machine which is directed to the operator's computer. As a result of the continuous detection of data of the delivered machines, the manufacturer will be capable of statistically analyzing the data of the machines and of using them for fault diagnosing programs.

Preferably, when analyzing the data, the desired operating data defined by the manufacturer are matched. As a result, peculiarities during the operation of the machine, such as differences in the material, climate differences, etc., can be taken into account.

According to another embodiment of the invention, the analysis of the data takes place by means of neuro FUZZY logic methods, so that the individual parameters are weighted with respect to their significance. Frequently, individual parameters are more important for the operation of the machine than other detected parameters so that, as a result of the weighting, a more precise analysis can be made of the operating condition of the machine.

Preferably, a computer or addressee is determined for the automatic output of the fault message, which computer or addressee is situated in a country with continuous working hours. Since larger machines are usually sold worldwide, in the event of damage, an expert for eliminating the damage must be available immediately. It is therefore important that the output of the fault message takes place where at that moment an expert can immediately start the damage analysis, if the automatic fault analysis can assign no clear fault. Such fault centers may be established in Asia, Europe and America, so that an expert will be available around the clock.

The information system according to the invention is essentially made available by the manufacturer of the machine. This manufacturer equips the machine with measuring devices which will then supply data to a computer located with the machine's operator. By way of software, the computer is automatically connected with the manufacturer's computer so that a data matching and/or a data transmission can take place. The information of the delivered machines is therefore bundled at the manufacturer's, and the manufacturer can start with a fault diagnosis and analysis of the data. The supplied data can also supply conclusions concerning the construction of the machine. It is also conceivable that the computer cyclically downloads the mathematical process model from the second computer at the site, for example, in the manufacturer's plant, and utilizes this process model for the first fault diagnosis.

In the following, the invention will be explained in detail by means of an embodiment with reference to the attached drawings.

FIG. 5 is a block diagram of a multilayer mathematical model.

Figure 1:
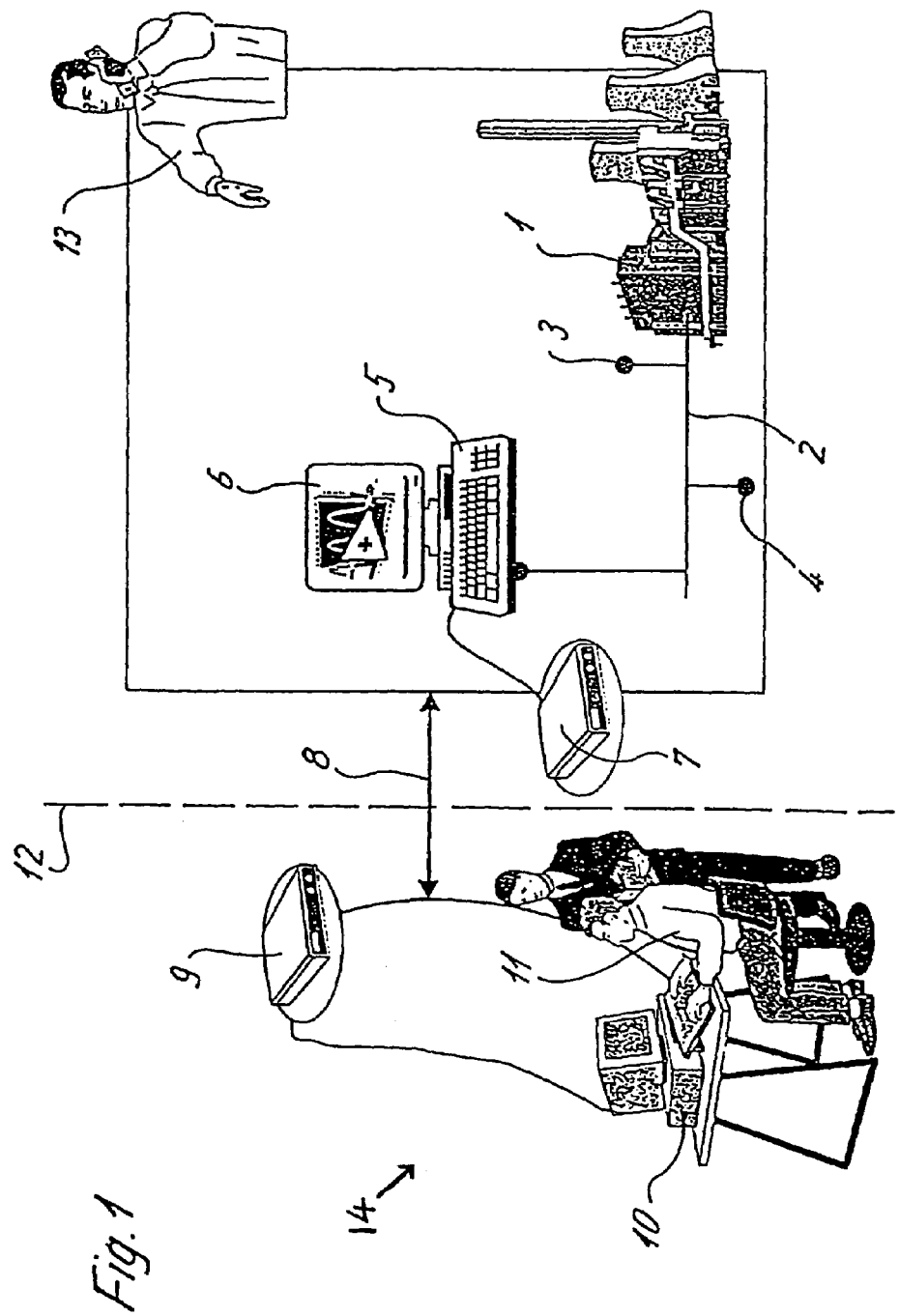
FIG. 1 is a block diagram of an embodiment of the information system according to the invention.

FIG. 1 is a schematic view of the information system according to the invention. In a factory or site 1 of the operator of a machine 20 (shown in FIG. 2), for example, of a decanter or of a separator, measured data are detected at the machine 20 and are transmitted by a bus system 2 within the site 1 to an addressee, for example, to peripherals, such as computers 3 and 4, on which process sequences can be visualized. By the bus system 2, the data detected at the machine 20 are transmitted to a computer 5 in which these data can be stored in a data bank. On the computer 5, the data can be visualized on a video screen 6. At defined intervals, the computer 5 automatically establishes a connection with a computer 10 of the manufacturer of the machine 20. For this purpose, a router 7 is provided which, by a network 8, for example, the Internet, the telephone network or another network, establishes a connection with a second router 9 at the manufacturer of the machine site 14. The spatial distance between computer 5 and computer 10 is illustrated by the broken line 12. Subsequently, an automatic data transmission takes place from computer 5 to computer 10.

An expert 11, who is familiar with the operating process of the machines 20, sits at the computer 10 at the manufacturer of the machine 20. At the computer 10, the detected data can, on the one hand, be automatically analyzed by means of the mathematic model if standardized fault conditions are detectable in the determined data, or, if no standardized faults are present, the expert 11 can carry out a manual fault diagnosis. If no faults can be recognized in the operating conditions, the detected data can provide conclusions at the manufacturer's for the operation of the machine 20.

Figure 2:
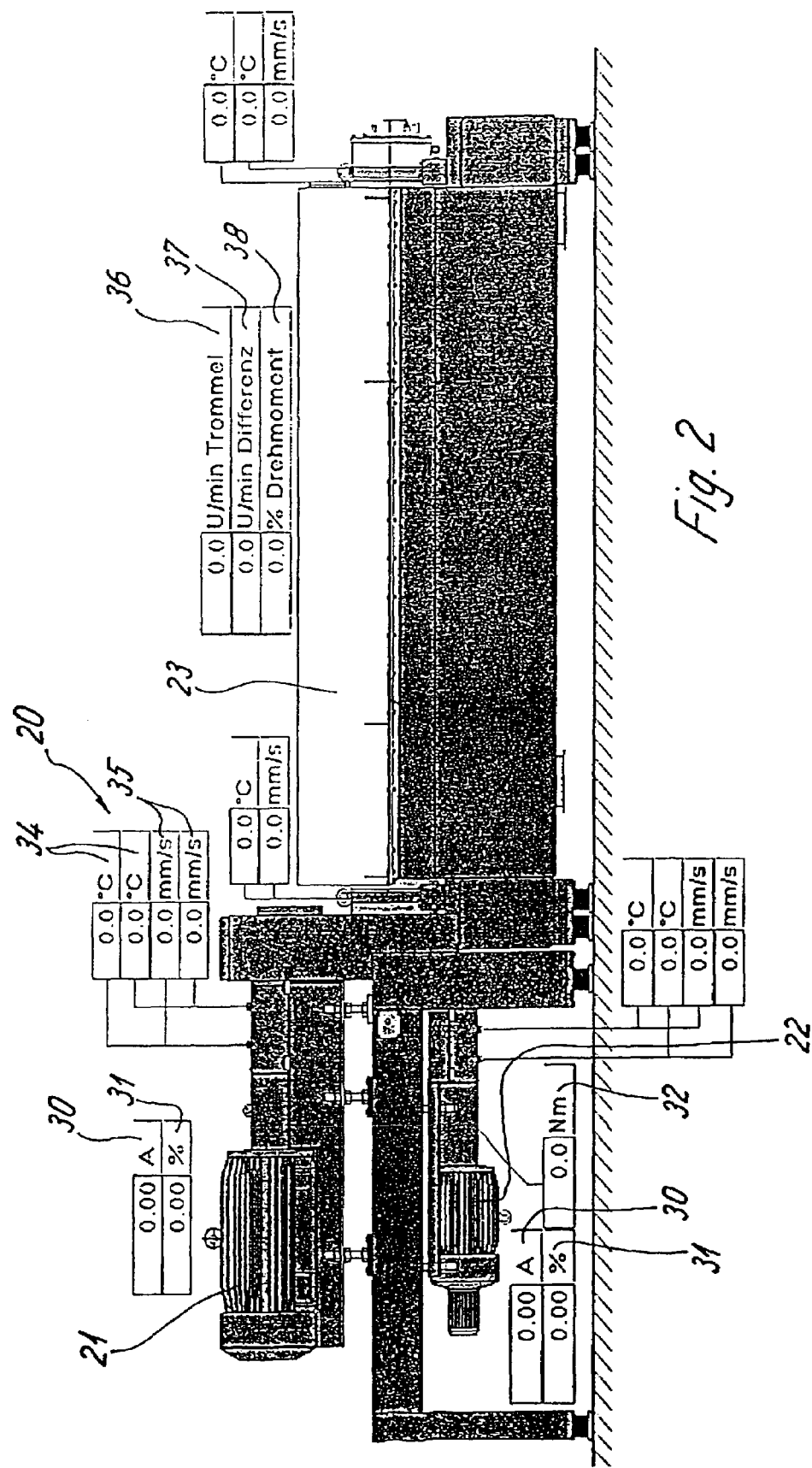
FIG. 2 is a schematic view of a machine having measuring devices.

As an example, FIG. 2 shows a machine 20 in the form of a decanter which is controlled or monitored according to the invention. The decanter comprises a main motor 21 which drives a drum 23. Below the main motor 21, another motor 22 is arranged which controls the drive of the screw (not shown) arranged in the drum 23. The current consumption 30 and the capacity 31 are detected at the main motor 21. The current consumption 30, the capacity 31 and the torque 32 are detected at motor 22. In addition, bearing temperatures 34, vibratory power 35, rotations of the drum 36, the difference between rotations of the drum and the screw 37, and the torque are detected at the decanter 20. In addition, data, such as product temperature, oil bath temperature, vibrations, inflow quantity, are detected in order to monitor the production sequence per se. Furthermore, product-specific parameters, such as the inflow quantity, the flocculent quantity, the diluting water quantity, the cooling water quantity, the inflow concentration, the flocculent concentration are detected in order to detect the operating condition for the specific production sequence. FIG. 2 therefore only shows detected measuring conditions as an example because in practice significantly more data are detected from the machine 20.

Figure 3:
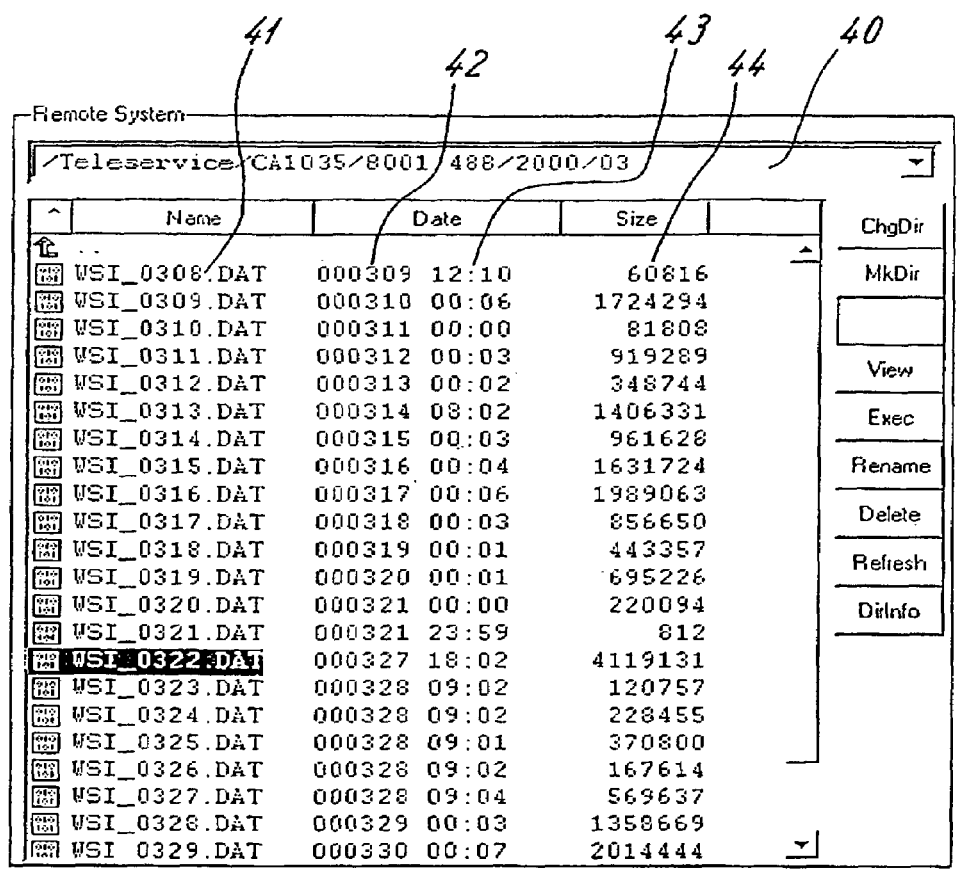
FIG. 3 is a view of the surface for the data transmission process.

The data detected by the machine 20 are collected and stored in the computer 5. At regular intervals, these data are transmitted to the manufacturer's computer 10. FIG. 3 shows a surface for the data transmission. During the data transmission, a file name 40 is used which contains the machine type (CA 1035), the special machine number and a date entry. This allows a clear assignment to a certain machine. The manufacturer can therefore in a simple manner sort the data received from various machines. The data are filed under a file name 41 and contain date entries 42 and 43 as well as storage quantity data 44.

Figure 4:
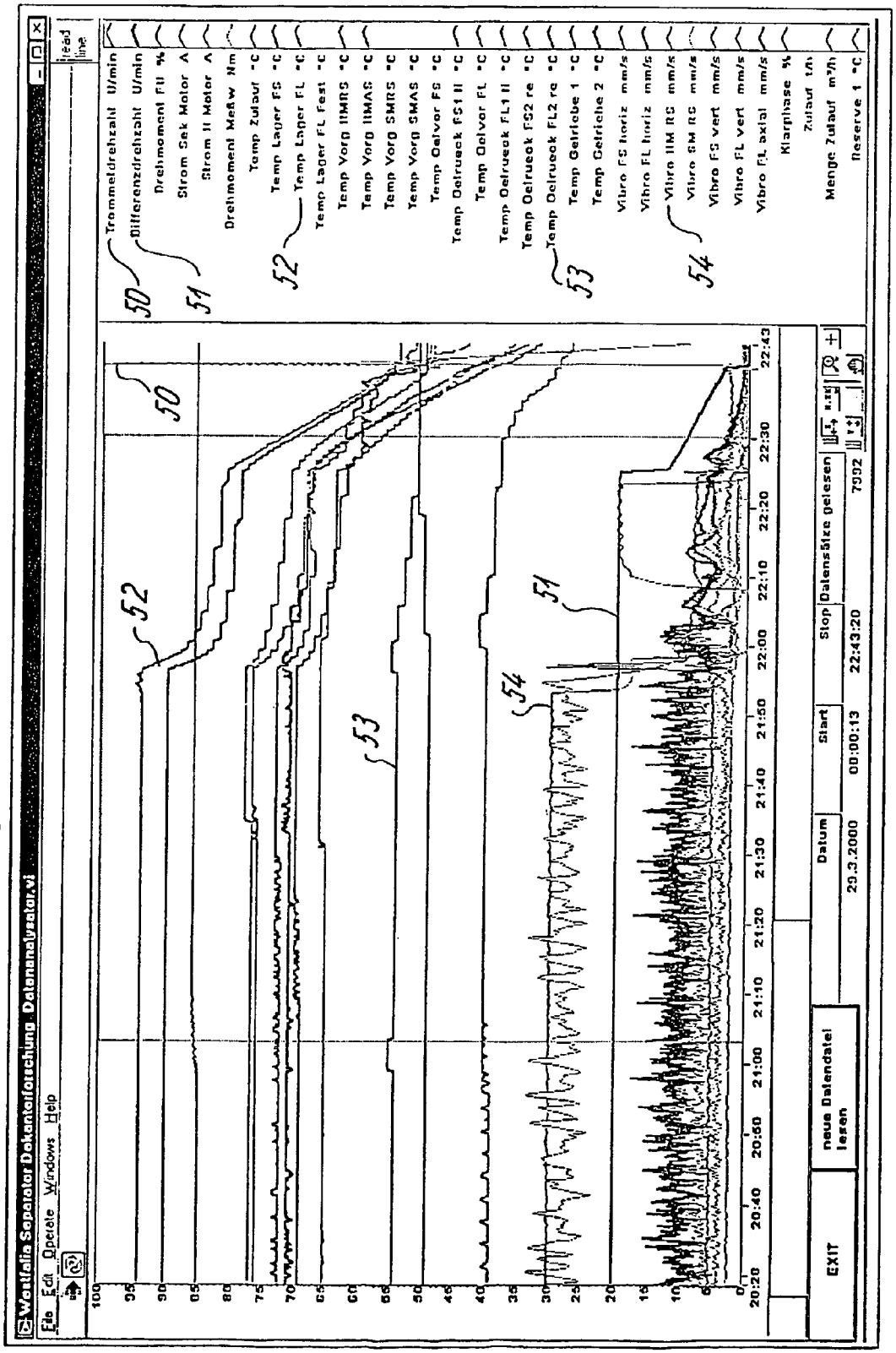
FIG. 4 is a view of a surface for the monitoring and diagnosis of the machine.

FIG. 4 illustrates a surface which is displayed on the video screen of the computer 10 of the manufacturer in order to analyze possible faults. The operating conditions detected at the machine 20 are listed in the right column on the video screen, in which case, for example, the rotational drum speed 50, the differential rotational speed 51, the bearing temperature 52, the oil return flow temperature 53 and the vibration 54 were detected. The individual detected data are entered above the time in the diagram, on the left side of the diagram, a scaling being freely selectable. As a result of the course of the curves, a fault diagnosis can be carried out. On the one hand, the computer 10 can automatically analyze the operating conditions in order to generate automatic fault messages for standardized faults. By means of neuro FUZZY logic methods, the system itself is adaptive and can recognize new fault conditions. In this case, fault messages can be automatically generated which are transmitted to the expert 11 per e-mail, SMS or other means, so that this expert can react on a short-term basis. The expert 11 can therefore address the customer 13 directly so that the down time of the machine 20 is minimized. In this case, the output of the fault message takes place to an expert 11 during his working hours so that, for example, when it is night time in Europe, the fault message is automatically sent to Japan or the U.S. If no standardized fault message can be generated, the expert 11 has to carry out a manual analysis but in the process can use to the previously received data of the machine 20 which increases the precision of the diagnosis.

The information system according to the invention was described by means of a decanter. It can also arbitrarily be used for other machines, in the case of which continuous operating conditions are detected, for example, when memory-programmable controls and measuring devices are provided on the machine. The transmission of the data can take place by means of freely selectable lines or transmission paths.

FIG. 5 is a block diagram of a mathematical model which can be used in the information system. The first plane 60 contains general characteristics of the respective machine type, for example, of a decanter. In the second plane 61, 62 and 63, various process- and product-specific models are illustrated. In the third plane, characteristics 64, 65, etc. are filed which relate to the respective machine. The data detected at the machine 20 are distributed to the individual planes 60 to 65, etc. in order to analyze the operating conditions in the individual planes. The system will then itself be capable to recognize whether a process fault, a machine fault or a fault is present which is based on a combination of process faults and machine faults.

The invention claimed is:

1. A method for controlling systems and/or machines, having the following steps:
   detecting operating conditions data, including one or more machine specific parameters;
   collecting and storing the detected data in a data bank of a first computer;
   transmitting the data to a memory of a second computer;
   analyzing the data by and comparison with the desired conditions of a multilayer mathematical model of the machine and of a process performed by the machine;
   detecting the actual condition and generating a fault message if the actual condition deviates from desired conditions; and
   automatically outputting the fault message by the second computer to an addressee which includes one or more of a peripheral unit and another computer.

2. The method according to claim 1, wherein the automatic output of the fault message takes place as e-mail.

3. The method according to claim 1, including adapting the desired operating data to actual conditions during the analysis of the data.

4. The method according to claim 1, wherein the analysis of the data takes place by neural FUZZY logic methods, and the machine specific parameters are weighted in their significance.

5. The method according to claim 1, wherein the second computer generates control commands which are transmitted to the first computer.

6. The method according to claim 1, wherein, for the automatic output of the fault message, the addressee is determined which is situated in a country with current daytime working hours.

7. An information system for the operation of a machine, the system comprising:
   measuring devices for the detection of operating conditions data, including one or more machine specific parameters;
   a first computer connected with the measuring devices, for storing the detected data in a memory;
   a transmission device by means of which the stored data can be transmitted to a second computer;
   an analyzing unit which compares the transmitted data concerning the operating conditions with defined data of a multilayer mathematical model and of a process performed by the machine; and
   an output unit which, when the operating conditions deviate from a given value range of the defined data, emits a fault message.

8. The information system according to claim 7, wherein the analyzing unit comprises a data memory in which a plurality of fault conditions are stored with the pertaining operating conditions in the form of an adaptive multilayer mathematical model.

9. The information system according to claim 7, wherein, when certain fault conditions have been met, control commands are generated by the analyzing unit.

10. The information system according to claim 7, wherein the machine is a decanter or separator, and the measuring devices on the machine detect one or more of the machine specific parameters including current consumption, temperature at predetermined measuring points and rotational speed of a drum.

11. The method according to claim 1, wherein the fault message is addressed to an expert for corrective action.

12. The method according to claim 1, wherein, for predetermined fault conditions, the fault message includes corrective action.

13. The method according to claim 1, wherein the fault message is for a potential fault.

14. A method for controlling systems and/or machines, having the following steps:
   detecting operating conditions data, including one or more of the following parameters: current consumption, temperature and conveying speeds at the machine;
   collecting and storing the detected data in a data bank of a first computer;
   transmitting the data to a memory of a second computer;
   analyzing the data by and comparison with the desired conditions of a mathematical model of the machine;

detecting the actual condition and generating a fault message if the actual condition deviates from desired conditions;

automatically outputting the fault message by the second computer to an addressee which includes one or more of a peripheral unit and another computer; and wherein the analysis of the data takes place by neural FUZZY logic methods, and the individual parameters are weighted in their significance.

15. An information system for the operation of a machine, the system comprising:

measuring devices for the detection of operating conditions data, including one or more of the following parameters: current consumption, temperature and conveying speeds at the machine;

a first computer connected with the measuring devices, for storing the detected data in a memory;

a transmission device by means of which the stored data can be transmitted to a second computer;

an analyzing unit which compares the transmitted data concerning the operating conditions with defined data of a mathematical model;

an output unit which, when the operating conditions deviate from a given value range of the defined data, emits a fault message; and wherein the analyzing unit employs neural FUZZY logic methods, and the parameters are weighted on the basis of their importance.

* * * * *